(12) United States Patent
Mramor et al.

(10) Patent No.: US 6,336,651 B1
(45) Date of Patent: Jan. 8, 2002

(54) INFLATABLE VEHICLE OCCUPANT PROTECTION DEVICE

(75) Inventors: Vincent J. Mramor, Chandler; Timothy A. Swann, Mesa; Kevin M. Brown, Mesa; Roy D. Van Wynsberghe, Mesa; Bryan W. Shirk, Mesa; Eric C. Erike, Mesa, all of AZ (US)

(73) Assignee: TRW INC, Lyndhurst, OH (US)

( * ) Notice: Subject to any disclaimer, the term of this patent is extended or adjusted under 35 U.S.C. 154(b) by 0 days.

(21) Appl. No.: 09/616,250

(22) Filed: Jul. 14, 2000

(51) Int. Cl.$^7$ .............................................. B60R 21/22
(52) U.S. Cl. ................................. 280/728.2; 280/730.2
(58) Field of Search ......................... 280/728.2, 730.1, 280/730.2

(56) References Cited

U.S. PATENT DOCUMENTS

| | | |
|---|---|---|
| 5,362,097 A | 11/1994 | Barske |
| 5,540,459 A | 7/1996 | Daniel |
| 5,755,457 A | 5/1998 | Specht |
| 5,788,270 A | 8/1998 | Haland et al. |
| 5,791,680 A | 8/1998 | Dyer |
| 5,791,683 A | 8/1998 | Shibata et al. |
| 5,921,576 A * | 7/1999 | Sinnhuber |
| 6,022,044 A * | 2/2000 | Cherry |
| 6,103,984 A * | 8/2000 | Bowers et al. |
| 6,149,185 A * | 11/2000 | White et al. |
| 6,209,907 B1 * | 4/2001 | Fischer |
| 6,220,625 B1 * | 4/2001 | Wallner et al. |
| 6,224,091 B1 * | 5/2001 | Eyrainer et al. |

* cited by examiner

Primary Examiner—Paul N. Dickson
(74) Attorney, Agent, or Firm—Tarolli, Sundheim, Covell, Tummino & Szabo L.L.P.

(57) ABSTRACT

Apparatus (10) for helping to protect an occupant of a vehicle (12) that has a side structure (16) and a roof (18) comprises an inflatable vehicle occupant protection device (14). The inflatable vehicle occupant protection device (14) is inflatable away from the vehicle roof (18) into a position between the side structure (16) of the vehicle (12) and a vehicle occupant. The apparatus (10) also includes a plastic housing (26) for storing the inflatable vehicle occupant protection device (14) in a stored position. An inflation fluid source (24) provides inflation fluid for inflating the inflatable vehicle occupant protection device (14). A fill tube (22) directs the inflation fluid into the inflatable vehicle occupant protection device (14) to inflate the inflatable vehicle occupant protection device. The fill tube (22) is connected to the housing (26) by plastic connection portions (160) of the housing that have a surface (162) in continuous engagement with portions of an outer surface (164) of the fill tube. The connection portions (160) and the remaining portions of the housing (26) are constructed of a single piece of homogeneous plastic material.

26 Claims, 3 Drawing Sheets

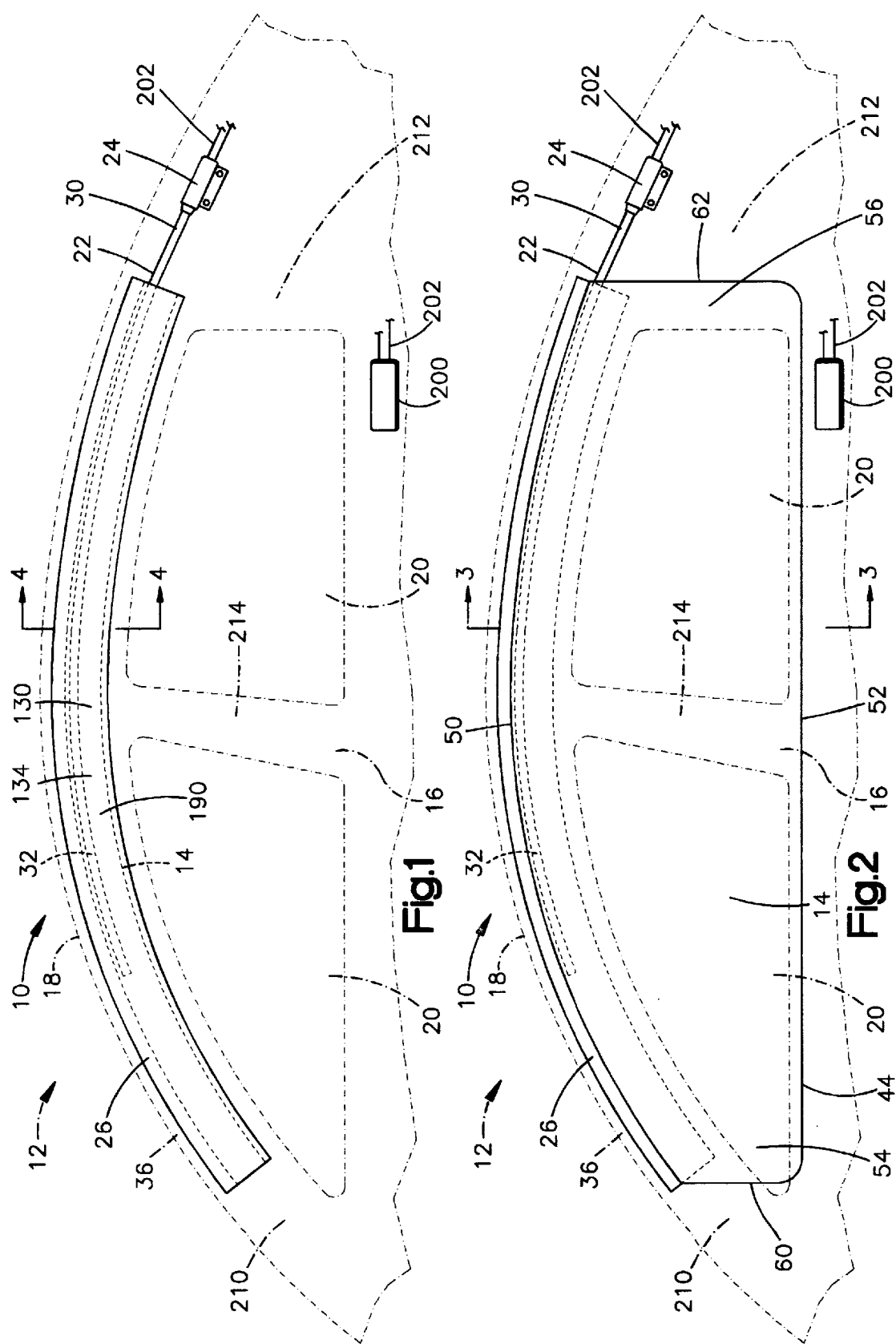

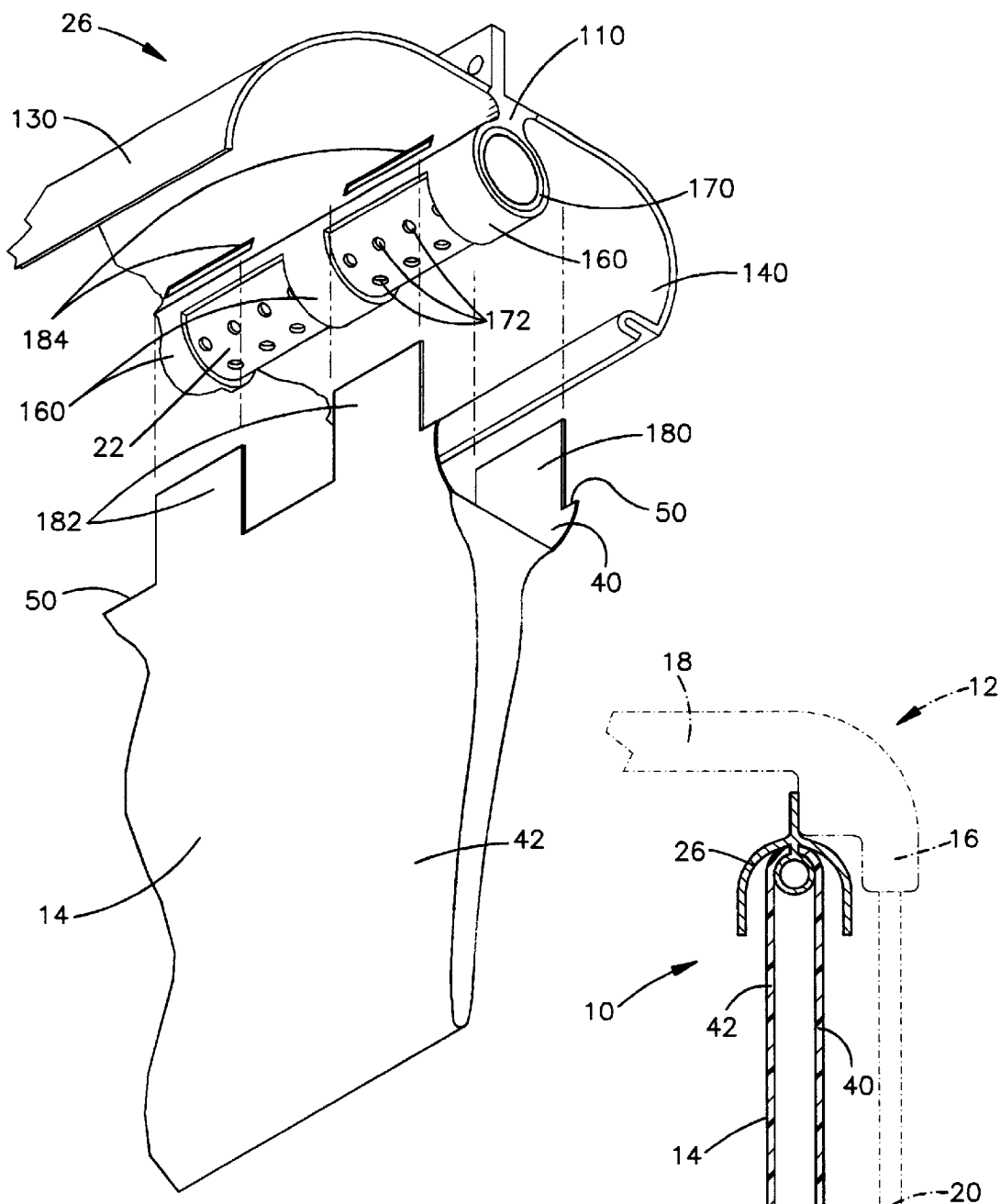

INFLATABLE VEHICLE OCCUPANT PROTECTION DEVICE

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device that is inflatable away from the vehicle roof into a position between the side structure of the vehicle and a vehicle occupant. The apparatus also includes a plastic housing for storing the inflatable vehicle occupant protection device in a stored position. An inflation fluid source provides inflation fluid for inflating the inflatable vehicle occupant protection device. A fill tube directs the inflation fluid into the inflatable vehicle occupant protection device to inflate the inflatable vehicle occupant protection device. The fill tube is connected to the housing by plastic connection portions of the housing that have a surface in continuous engagement with portions of an outer surface of the fill tube. The connection portions and the remaining portions of the housing are constructed of a single piece of homogeneous plastic material.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect a vehicle occupant illustrating the apparatus in a deflated condition, according to the invention;

FIG. 2 is a schematic view of the apparatus of FIG. 1 in an inflated condition;

FIG. 3 is a sectional view of the apparatus taken generally along line 3—3 in FIG. 2;

FIG. 5 is a perspective view of a portion of the apparatus of FIG. 1, illustrating the assembly of the apparatus.

DESCRIPTION OF PREFERRED EMBODIMENTS

Figure 4:
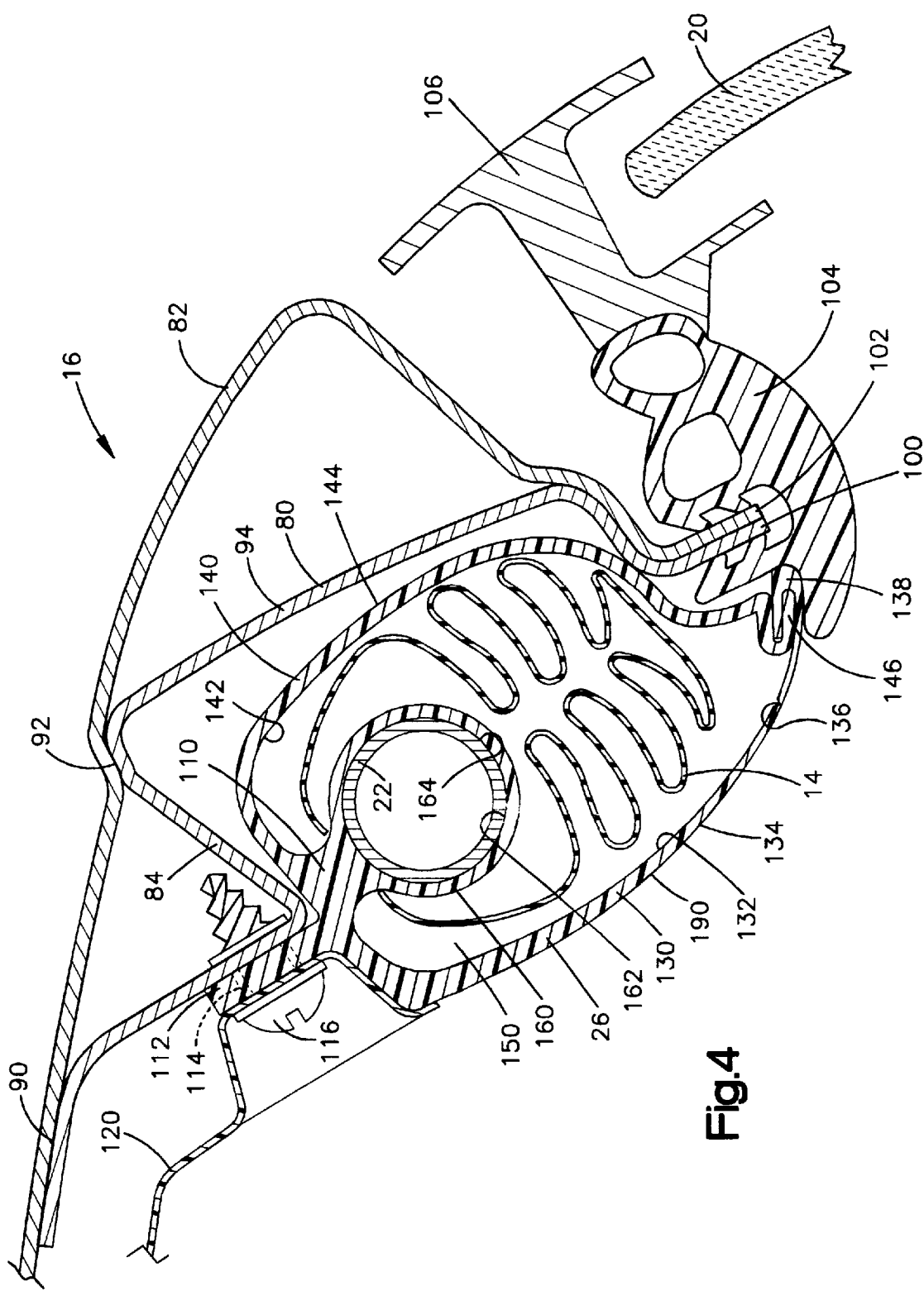
FIG. 4 is a sectional view of the apparatus taken generally along line 4—4 in FIG. 1.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 may be connected directly to the inflator 24 or a manifold (not shown) may connect the fill tube to the inflator. The fill tube 22 has a second end portion 32 disposed in the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a plastic housing 26 that stores the inflatable curtain 14 in a deflated condition. The fill tube 22, the deflated inflatable curtain 14, and the housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions of the first and second panels 40 and 42 are secured together by weaving or stitching the panels together along at least a portion of a perimeter 44 (FIGS. 2 and 3) of the inflatable curtain 14 to form an inflatable volume of the curtain.

The perimeter 44 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges. In the embodiment illustrated in FIG. 2, the front and rear portions 54 and 56 of the inflatable curtain 14 are partially defined by front and rear edges 60 and 62, respectively, that are spaced horizontally apart along the upper and lower edges 50 and 52 and extend vertically between the upper and lower edges. The front and rear edges 60 and 62, however, could be omitted and the upper and lower edges 50 and 52 could be extended until they intersect, in which case the front and rear portions 54 and 56 would be defined by the intersecting upper and lower edges. Also, while the front and rear edges 60 and 62 are illustrated as being generally vertical, they could extend at some other angle between the upper and lower edges 50 and 52.

As illustrated in FIG. 3, the inflatable curtain 14 is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching, ultrasonic bonding, heat welding, or adhesive bonding that extends around the entire perimeter 44 of the panels to form the inflatable curtain 14.

The first and second panels 40 and 42 are constructed of a fabric, such as nylon, that is coated with a gas impermeable material, such as urethane or silicone. The inflatable curtain 14 thus may have a substantially gas-tight construction.

Other materials, such as elastomers, plastic films, or combinations thereof, may also be used to construct the inflatable curtain 14. The first and second panels 40 and 42 may also be formed of single or multi-layered sheets of material.

Referring now to FIG. 4, the vehicle side structure 16 includes a metal support rail 80 adjacent to and inside a roof panel 82. A V-shaped inner section 84 of the support rail 80 is welded to the roof panel 82 at two locations 90 and 92. A main leg 94 of the support rail 80 extends downward and outward from the inner section 84. An outer edge portion 100 of the support rail 80 overlies and is welded to an outer edge portion 102 of the roof panel 82.

The vehicle side structure 16 also includes a window seal or bulb seal 104 that is supported on the outer edge portion 102 of the roof panel 82 and the outer edge portion 100 of the support rail 80. A vehicle door 106 supports the side window 20 and engages the bulb seal 104 when the door is closed.

As illustrated in FIG. 4, the housing 26 is constructed of a single piece of homogeneous material. The housing 26 is preferably extruded or molded from a plastic material. The housing 26 includes a central body portion 110 and a mounting flange 112 that projects from the central body portion 110. The mounting flange 112 has a generally rectangular cross-section and includes at least one aperture 114 for receiving a fastener 116, such as a screw or bolt. The fastener 116 connects the housing 26 to the inner section 84 of the vehicle side structure 16. The fastener 116 may also connect a vehicle headliner 120 to the vehicle side structure 16.

The housing 26 includes an inner cover flap 130 and an outer cover flap 140. The cover flaps 130 and 140 extend from the central body portion 110 in directions away from the mounting flange 112 and away from each other. The cover flaps 130 and 140 extend for substantially the entire length of the housing 26.

The inner cover flap 130 has an inner side surface 132 and an outer side surface 134. The inner side surface 132 of the inner cover flap 130 includes a tear seam 136 in the form of a notch or slot that extends along a substantial portion of the length of the inner cover flap. The inner cover flap 130 has a generally U-shaped terminal edge portion 138 along its edge opposite the central body portion 110. The outer cover flap 140 has an inner side surface 142 and an outer side surface 144. The outer cover flap 140 has a generally U-shaped terminal edge portion 146 along its edge opposite the central body portion 110.

The terminal edge portions 138 and 146 of the inner and outer cover flaps 130 and 140 interlock with each other to connect the inner and outer cover flaps. The interlocking terminal edge portions 138 and 146 are received under the bulb seal 104. The inner and outer cover flaps 130 and 140 thus help to define an enclosed storage area 150 for the inflatable curtain 14 when the curtain is deflated and folded in the stored condition.

The housing 26 includes plastic connection portions 160 that extends downward (as viewed in FIGS. 4 and 5) from the central body portion 110 of the housing, between the inner and outer flaps 130 and 140. The connection portions 160 have surfaces 162 (FIG. 4) that are in continuous engagement with an outer surface 164 of the fill tube 22 and connect the fill tube to the housing 26. The connection portions 160 preferably extend around the entire circumference of the fill tube 22.

According to the present invention, the fill tube 22 (FIGS. 4 and 5) is insert molded in the housing 26. By insert molding, it is meant that the fill tube 22, which is preferably constructed of metal, is placed in a mold and the mold is filled with plastic to mold the housing 26 around the fill tube 22. Thus, the connection portions 160 and the remaining portions of the housing 26 are constructed of a single piece of homogeneous plastic material.

As illustrated in FIG. 5, the fill tube 22 includes a sidewall 170 and a plurality of inflation fluid outlets 172 that extend through the sidewall. The inflation fluid outlets 172 are spaced along the length of the fill tube 22, in between the connection portions 160, and are directed generally away from the central body portion 110 of the housing 26.

The cover flaps 130 and 140 have a generally curved configuration and are resiliently movable from the closed condition illustrated in FIG. 4 to an opened condition illustrated in FIG. 5 and vice versa. The inflatable curtain 14 may be connected to the housing 26 when the housing is in the opened condition. As illustrated in FIG. 5, the inflatable curtain 14 includes first tabs 180 that extend from the first panel 40 along the upper edge 50 of the curtain and second tabs 182 that extend from the second panel 42 along the upper edge of the curtain. The first and second tabs 180 and 182 are insertable into slots 184 that extend through the central body portion 110. The first and second tabs 180 and 182 extend through the slots 184 and are positioned such that portions of the tabs overlie each other. The overlying portions of the tabs 180 and 182 are interconnected by known means, such as stitching, ultrasonic bonding, or adhesive bonding, to connect the inflatable curtain 14 to the housing 26.

It will be recognized by those skilled in the art that there may be alternative methods by which to connect the inflatable curtain 14 to the housing 26. For example, the first and second tabs 180 and 182 could extend around the fill tube 22 and be interconnected to connect the inflatable curtain to the fill tube. Also, the housing 26 could include hooks that support the inflatable curtain 14, or the curtain could be fitted with C-shaped snap rings that clamp around the fill tube 22 to connect the curtain to the housing.

When the inflatable curtain 14 is connected to the housing 26, the fill tube 22 is disposed in the inflatable volume of the curtain. The inflation fluid outlets 172 provide fluid communication between the fill tube 22 and the inflatable curtain 14.

The curtain is folded and the inner and outer flaps 130 and 140 are closed around the curtain to store the curtain in the storage area 150 (FIG. 4) of the housing. When the inflatable curtain 14 is in the stored position of FIGS. 1 and 4, the outer side surface 134 of the inner cover flap 130 may form an interior trim piece 190 of the vehicle 12. The interior trim piece 190 is an exposed surface that is visible from inside the vehicle passenger compartment.

The vehicle 12 includes a sensor mechanism 200 (shown schematically in FIGS. 1 and 2) for sensing a side impact to the vehicle 12 and/or a rollover of the vehicle 12. The sensor mechanism 200 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 200 provides an electrical signal over lead wires 202 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The housing 26 (FIG. 4)

opens along the tear seam 136 under the pressure of the inflation fluid. The inflatable curtain 14 (FIG. 1) inflates away from the roof 18 in a downward direction as shown in the drawings and in a downward direction with respect to the direction of forward travel of the vehicle 12 into the position illustrated in FIGS. 2 and 3.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 (FIG. 2) is positioned adjacent to the intersection of the roof 18 and the side structure 16 of the vehicle 12. The front portion 54 is positioned adjacent to an A pillar 210 of the vehicle 12. The rear portion 56 of the inflatable curtain 14 is positioned adjacent to a C pillar 212 of the vehicle 12. The inflatable curtain 14 extends between the A pillar 210 and the C pillar 212 of the vehicle 12 and overlies at least a portion of the A pillar, C pillar, and a B pillar 214 of the vehicle.

It will be recognized by those skilled in the art that the inflatable curtain 14 may have alternative configurations. For example, in the illustrated embodiment, the inflatable curtain 14 extends between the A pillar 210 and the C pillar 212 of the vehicle 12. The inflatable curtain 14 could, however, extend between the A pillar 210 and the B pillar 214 only or between the B pillar and the C pillar 212 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When inflated, the inflatable curtain 14 helps to absorb the energy of impacts with the curtain and helps to distribute the impact energy over a large area of the curtain.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device that is inflatable in a direction away from the vehicle roof into a position between the side structure of the vehicle and a vehicle occupant;

a plastic housing for storing said inflatable vehicle occupant protection device in a stored position;

an inflation fluid source that provides inflation fluid for inflating said inflatable vehicle occupant protection device; and a fill tube for directing said inflation fluid into said inflatable vehicle occupant protection device to inflate said inflatable vehicle occupant protection device, said fill tube being constructed of a piece of material separate from said housing, said fill tube being connected to said housing by plastic connection portions of said housing that have a surface in continuous engagement with portions of an outer surface of said fill tube, said connection portions and the remaining portions of said housing being constructed of a single piece of plastic material.

2. Apparatus as defined in claim 1, wherein said inflatable vehicle occupant protection device is an inflatable curtain, said inflatable curtain extending along the side structure adjacent to the vehicle roof when said inflatable curtain is in said stored position.

3. Apparatus as defined in claim 2, wherein said outer surface of said fill tube has a generally cylindrical shape, said connection portions of said housing extending circumferentially along said portions of said outer surface in continuous engagement with said portions of said outer surface.

4. Apparatus as defined in claim 2, wherein said fill tube includes ports for directing said inflation fluid from said fill tube into said inflatable curtain, said ports being spaced apart at locations along said fill tube different than said portions of said outer surface in continuous engagement with said connection portions.

5. Apparatus as defined in claim 4, wherein said inflatable curtain comprises overlying panels having portions that are interconnected to define an inflatable volume, said ports being in fluid communication with said inflatable volume.

6. Apparatus as defined in claim 2, wherein said inflatable curtain is connected to said housing.

7. Apparatus as defined in claim 2, wherein said inflatable curtain is connected to said fill tube.

8. Apparatus as defined in claim 2, wherein said fill tube is constructed of metal.

9. Apparatus as defined in claim 2, wherein a portion of said housing forms an interior trim piece of the vehicle.

10. Apparatus as defined in claim 2, wherein said inflatable curtain when inflated extends along the side structure of the vehicle between an A pillar and a C pillar of the vehicle.

11. Apparatus as defined in claim 2, wherein said inflatable curtain, when inflated, overlies at least a portion of an A pillar, a B pillar and a C pillar of the vehicle.

12. Apparatus as defined in claim 2, further comprising a sensor for sensing a vehicle condition for which deployment of said inflatable curtain is desired, said sensor actuating said inflation fluid source to provide inflation fluid to inflate said inflatable curtain.

13. Apparatus as defined in claim 2, wherein said inflation fluid source comprises an inflator that is actuatable to inflate said inflatable curtain.

14. Apparatus as defined in claim 2, wherein said inflatable curtain includes a plurality of tab portions extending from an upper edge of said inflatable curtain, said housing including a plurality of slots for receiving said tab portions to connect said inflatable curtain to said housing.

15. Apparatus as defined in claim 14, wherein said inflatable curtain comprises overlying panels interconnected to define an inflatable volume of said inflatable curtain, said tab portions being spaced apart along upper edges of said first and second panels.

16. Apparatus as defined in claim 14, wherein said tab portions extend through said slots and are positioned such that portions of said tab portions overlie each other, said overlying portions being interconnected to connect said inflatable curtain to said housing.

17. Apparatus as defined in claim 16, wherein said tab portions extend around said fill tube.

18. Apparatus as defined in claim 17, wherein said tab portions connect said inflatable curtain to said fill tube.

19. Apparatus for helping to protect an occupant of a vehicle that has a side structure and a roof, said apparatus comprising:

an inflatable vehicle occupant protection device that is inflatable in a direction away from the vehicle roof into a position between the side structure of the vehicle and a vehicle occupant;

an inflation fluid source that provides inflation fluid for inflating said inflatable vehicle occupant protection device;

a fill tube for directing said inflation fluid into said inflatable vehicle occupant protection device to inflate said inflatable vehicle occupant protection device, said fill tube having a length and including a plurality of inflation fluid outlets arranged in groups spaced apart along the length of said fill tube; and a housing for storing said inflatable vehicle occupant protection device in a stored position, said housing being constructed of a single piece of plastic material;

said housing including connection portions for connecting said fill tube to said housing, said connection portions in continuous engagement with portions of an outer surface of said fill tube extending circumferentially around said fill tube, said connection portions being positioned between said groups of inflation fluid outlets.

20. Apparatus for helping to protect an occupant of a vehicle that has a side structure and a roof, said apparatus comprising:

an inflatable vehicle occupant protection device that is inflatable in a direction away from the vehicle roof into a position between the side structure of the vehicle and a vehicle occupant, said inflatable vehicle occupant protection device including a plurality of tab portions extending from an upper edge of said inflatable vehicle occupant protection device;

a housing for storing said inflatable vehicle occupant protection device in a stored position, said housing being constructed of a single piece of plastic material, said housing including a plurality of slots for receiving said tab portions to connect said inflatable vehicle occupant protection device to said housing;

an inflation fluid source that provides inflation fluid for inflating said inflatable vehicle occupant protection device; and a fill tube for directing said inflation fluid into said inflatable vehicle occupant protection device to inflate said inflatable vehicle occupant protection device, said fill tube being connected to said housing by connection portions of said housing extending circumferentially around an outer surface of said fill tube in continuous engagement with said outer surface, said connection portions being spaced axially along said fill tube.

21. Apparatus for helping to protect an occupant of a vehicle that has a side structure and a roof, said apparatus comprising:

an inflatable vehicle occupant protection device that is inflatable in a direction away from the vehicle roof into a position between the side structure of the vehicle and a vehicle occupant;

an inflation fluid source that provides inflation fluid for inflating said inflatable vehicle occupant protection device;

a fill tube for directing said inflation fluid into said inflatable vehicle occupant protection device to inflate said inflatable vehicle occupant protection device; and a housing for storing said inflatable vehicle occupant protection device in a stored position, said housing including central portion extending along a length of said housing and first and second flaps extending from opposite longitudinal edges of said central portion, said first and second flaps each having a respective longitudinal end portion positioned opposite said central portion and extending along the length of said housing, said longitudinal end portions of said first and second flaps being adapted to interlock with each other to connect said first and second flaps along said longitudinal end portions, said first and second flaps when connected helping to define a chamber for storing said inflatable vehicle occupant protection device in said stored position, said housing further including connection portions for connecting said fill tube to said housing, said connection portions extending from an inner surface of said central portion between said longitudinal edges of said central portion, said connection portions having surfaces in continuous engagement with an outer surface of said fill tube, said connection portions and said fill tube being positioned in said chamber when said first and second flaps are connected along said longitudinal end portions.

22. Apparatus as defined in claim 21, wherein said housing further comprises a mounting flange that projects from an outer surface of said central portion opposite said inner surface of said central portion, said mounting flange being adapted to receive means for connecting said housing to the vehicle.

23. Apparatus as defined in claim 21, wherein said fill tube includes a plurality of inflation fluid outlets arranged in groups, said groups being spaced axially along a length of said fill tube and positioned between said connection portions of said housing.

24. Apparatus as defined in claim 21, wherein said inflatable vehicle occupant protection device includes a plurality of tab portions extending from an upper edge of said inflatable vehicle occupant protection device, said housing including a plurality of slots extending through said central portion for receiving said tab portions, said tab portions extending through said slots and being connected to each other to connect said inflatable vehicle occupant protection device to said housing.

25. Apparatus as defined in claim 21, wherein said first flap includes a tear seam extending along the length of said housing, said tear seam being spaced away from said longitudinal end portion of said first flap.

26. Apparatus as defined in claim 21, wherein said longitudinal end portions of said first and second flaps each have a generally U-shaped configuration forming a channel extending longitudinally along said longitudinal end portions, said longitudinal end portions when interlocked being inverted relative to each other and positioned such that a terminal edge portion of said first flap is received in said channel formed along the longitudinal end portion of said second flap and such that a terminal edge portion of said second flap is received in said channel formed along the longitudinal end portion of said first flap.

* * * * *